United States Patent Office 3,007,217
Patented Nov. 7, 1961

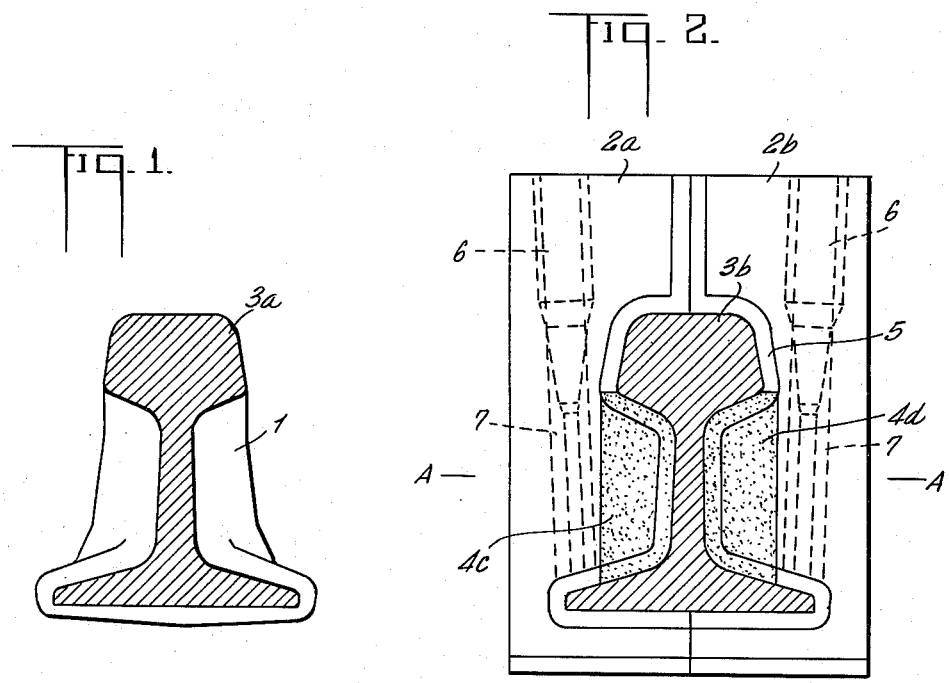
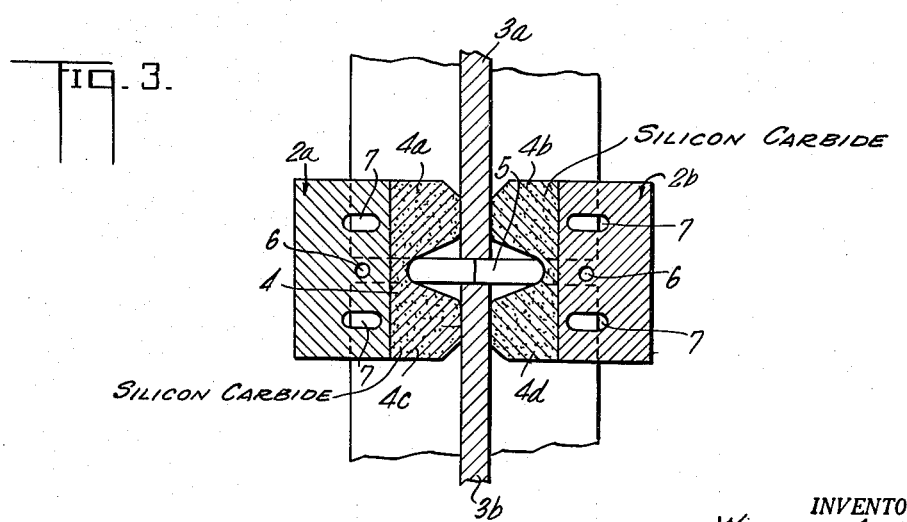

3,007,217
MOLD FOR ALUMINOTHERMIC WELDING OF RAILS AND THE LIKE
Wilhelm Ahlert, Essen, Germany, assignor to Elektro-Thermit G.m.b.H., Essen, Germany
Filed Mar. 8, 1960, Ser. No. 13,503
Claims priority, application Germany Mar. 16, 1959
7 Claims. (Cl. 22—116)

This invention relates to molds for carrying out aluminothermic welding of rails and similar work pieces.

It is one of the primary objects of the invention to provide means facilitating rapid heat transfer from the mold at which aluminothermic steel is located or concentrated for welding of said work pieces.

It is another object of the present invention to provide means affording avoidance of cracks and fissures in steel rail bonds and at locations thereof where aluminothermic steel becomes effective and in particular at the rail web beads, so that the heat will be rapidly dissipated and, in particular, at locations where the thickness of the aluminothermic steel is relatively increased.

Yet a further object of the present invention is to provide means conducive to metallurgical influences of aluminothermic steel at locations at which silicon carbide is disposed in the mold, so that the silicon carbide which has the advantage of rapidly dissipating heat has the additional and unexpected advantage that there will be a hardening and strengthening at desired locations of the aluminothermic steel far beyond that which is expected so as to be unusual.

It is therefore still another object of the present invention to impart to aluminothermic steel composition a carburizing operational effect at predetermined locations of the rail joint to be established.

Yet a further object of the present invention is to provide means aiding in the production of thermite steel in which aluminum grit (particles) is mixed with specially prepared iron oxide and with certain additions of steel in a crucible of application to a rail joint.

In carrying out this invention alloys may be used of the types referred to in applicant's prior Patent 2,932,863, granted on April 19, 1960.

It is still another object of the present invention to provide means ensuring rapid performance of a thermite welding process in refractory molds, which may be carried from a remote location and applied to the rail joint in situ, whereby any after-treatment of the respective mold for the purpose of adapting the same to profiled rail ends may be readily achieved.

Still another object of the present invention is to provide means envisioning a highly efficient rail bond procedure which may be easily and quickly carried out under highly simplified thermite operational conditions heretofore not contemplated by the prior art.

These and other objects of the invention will become further apparent from the following detailed description, reference being made to the accompanying drawing, showing a preferred embodiment of the invention.

In the drawing:
FIG. 1 is a vertical sectional view through a welded rail bond or joint provided with ridges;
FIG. 2 is a side elevational view of the mold showing rails disposed in the mold and mold portions of silicon carbide, with the rails shown in section;
FIG. 3 is a horizontal sectional detail view taken along line A—A in FIG. 2.

With continuing reference to the accompanying drawing wherein like reference numerals designate similar parts throughout the various views, a section of a rail 3a is provided with a web ridge 1 adjacent the weld joint thereof with another rail 3b. This web ridge is formed by aluminothermic joint welding of the rails. Conventionally, the adjacent rail ends presenting a gap are surrounded by a mold, usually formed as a refractory mold sealed with the rails preheated in the interior of the mold and fused together by casting the aluminothermic-produced steel in the mold cavity surrounding the gap.

The molds usually employed have mold cavities enlarged well beyond the interstitial gap existing between the rails to enable a uniform preheating and to achieve a good washing and fusion of the rail ends by the melted or liquid aluminothermic steel. Thus at the weld point unnecessary ridges are produced, but it is noted that only the ridges must be removed at the rail head but can remain along the webs. However, because of the shape of the webs, the melted alloy at the webs is considerably thicker in dimension than elsewhere and there has been found that vertical shrinkage occurs in the web zone with the web ridges cooling differently both in time and space from other portions of the weld. This often causes fissures and cracks in the alumino-thermal steel ridges especially at the web.

The present invention contemplates the provision of means for eliminating the fissures and cracks and in carrying out this aluminothermic joint welding process a pair of mold halves 2a and 2b are employed which in conjunction with each other form a mold cavity 5. Extending into the mold cavity 5 are pairs of projections 4a, 4c and 4b, 4d provided for the mold halves 2a, 2b, respectively, which in conjunction with each other define the portion of the mold cavity in which material is to be received.

The mold portions 4a, 4c, 4b and 4d are preferably formed of silicon carbide which may be in a finely divided state and which may be tamped or packed using a binder such as water glass.

When using at specified locations silicon carbide, which has particularly good heat conductivity, it has been found through extensive experiments, that heat is taken away from the hot alloy at its thickest portions most rapidly. This is because the silicon carbide surrounds the thickest portions of the weld and at the web in particular. In addition to having the great benefit of a high degree of heat transfer and conduction, an unusual and unexpected result is achieved in that the web ridges which remain as part of the completed rail become extremely hard surfaced and resistant to wear, while also greatly strengthening the joint. This is a result of a carbonization effect on the steel used in the alloy and in part due to the fact that the surface of the steel is provided with a hard silicon carbide alloy surface.

If in rail welding the mold parts adjacent the head ridges of the weld consist of silicon carbide, the resistance to wear of the weld at these wear-stressed points is increased, while the remaining part of the weld, surrounded by normal mold sand, remains softer.

The mold materials metallurgically influencing the welding material and having particularly good heat conductivity may, in the molds according to the invention, be inserted or rammed as solid bodies into the mold consisting of cheaper plastic sand or mold materials composed of quartz sand, fire clay, or the like. It is especially advantageous to use ramming compositions of silicon carbide provided with binders of any kind in the production of the molds and to ram them in also at the respective points in specific quantity.

In carrying out the invention sprues 6 are used for pouring in the molten metal, it being noted that the sprues 6 as well as the risers 7 are remote from the silicon carbide portions 4a, 4c and 4b, 4d to insure against any deleterious effect in the mold provided by the moving metal being poured in or excess metal flowing out.

It will be seen that there has been defined a mold for aluminothermic welding of rails comprising a pair of mold halves 2a, 2b defining therebetween a mold cavity 5 and being adapted to receive ends of rails 3a, 3b therein. The mold halves have portions 4a, 4c, 4b and 4d of silicon carbide adjacent the mold cavity 5.

Since in these molds only the smaller part of the mold is in this way made of expensive mold material and the greater part of cheaper mold material, the attainment of the proven technical advantage is achieved at least expense.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A mold for aluminothermal welding of web-containing rails comprising a pair of mold halves having walls defining therebetween a mold cavity adapted to receive ends of rails therein, said walls having silicon carbide-comprising inner portions adjacent said cavity in the region adjacent the webs of said rails.

2. A mold according to claim 1, wherein said portions are formed of finely divided silicon carbide mixed with a binder.

3. A mold according to claim 1, wherein said mold halves are each provided with a sprue and at least one riser, said sprue and said riser being spaced from said portions of silicon carbide.

4. A mold according to claim 2, wherein said binder is water glass.

5. A mold according to claim 2, wherein the remaining part of the mold is composed of refractory material.

6. A mold for aluminothermal welding of rails having webs, comprising a pair of mold halves having walls defining therebetween a mold cavity for receiving the rails therein, said walls of the mold halves having inner portions projecting into said mold cavity in alignment with the webs of the rails, said portions being of silicon carbide.

7. In a refractory mold for the aluminothermic welding of web-comprising rails, wherein the rails to be welded are placed into a mold cavity defined by the inner walls of the mold with the rail ends spaced from and facing each other and wherein aluminothermic welding steel is introduced into the mold cavity, the improvement which comprises that the walls defining the mold cavity have silicon carbide-comprising portions thereby to facilitate heat dissipation and to prevent crack formation during the solidification of the welding steel, said silicon carbide comprising wall portions including projecting portions positioned adjacent the webs of the rails and being substantially complementary thereto.

References Cited in the file of this patent
UNITED STATES PATENTS

| | | |
|---|---|---|
| 2,469,062 | Begtrup | May 3, 1949 |
| 2,479,364 | Jocelyn | Aug. 16, 1949 |
| 2,908,056 | Schmid | Oct. 13, 1959 |